United States Patent
Morozov

(10) Patent No.: US 10,223,382 B2
(45) Date of Patent: Mar. 5, 2019

(54) METHOD OF AND SERVER FOR GENERATING RETRIEVING ORDER COMMANDS FOR RENDERING A MAP

(71) Applicant: YANDEX EUROPE AG, Lucerne (CH)

(72) Inventor: Andrii Igorevich Morozov, Kiev (UA)

(73) Assignee: YANDEX EUROPE AG, Lucerne (CH)

(*) Notice: Subject to any disclaimer, the term of this patent is extended or adjusted under 35 U.S.C. 154(b) by 0 days.

(21) Appl. No.: 15/606,190

(22) Filed: May 26, 2017

(65) Prior Publication Data

US 2018/0039655 A1    Feb. 8, 2018

(30) Foreign Application Priority Data

Aug. 5, 2016    (RU) ................................ 2016132427

(51) Int. Cl.
*G06F 17/30*    (2006.01)
*H04L 29/08*    (2006.01)

(52) U.S. Cl.
CPC .. *G06F 17/30241* (2013.01); *G06F 17/30905* (2013.01); *H04L 67/02* (2013.01); *H04L 67/322* (2013.01)

(58) Field of Classification Search
None
See application file for complete search history.

(56) References Cited

U.S. PATENT DOCUMENTS

| | | | |
|---|---|---|---|
| 7,734,412 B2 | 6/2010 | Shi et al. | |
| 2002/0015042 A1* | 2/2002 | Robotham | G06F 3/14 345/581 |
| 2005/0219268 A1* | 10/2005 | Kyle | G08G 1/096811 345/660 |
| 2013/0124563 A1 | 5/2013 | Cavelie et al. | |
| 2014/0365901 A1* | 12/2014 | Moha | G01C 21/367 715/738 |
| 2015/0262399 A1 | 9/2015 | Popescu | |
| 2015/0286741 A1* | 10/2015 | Zhu | G06F 17/30241 707/736 |

* cited by examiner

*Primary Examiner* — Jason A Pringle-Parker
(74) *Attorney, Agent, or Firm* — BCF LLP

(57) ABSTRACT

A method of rendering a map includes acquiring, by the server, device data and user data, the device data being indicative of characteristics of the client device and the user data being indicative of user behaviour of the user; determining priority map elements and auxiliary map elements within the plurality of map elements based on at least one of the device data and the user data, the priority map elements comprising priority map tiles and at least one of priority API data and priority resource data; generating retrieving order commands based on the priority map elements and the auxiliary map elements; and transmitting, by the server, the retrieving order commands to the client device, the retrieving order commands being instrumental in causing the client device to retrieve the map elements in a prescribed order of retrieval, the priority map elements are to be retrieved before the auxiliary map elements.

18 Claims, 4 Drawing Sheets

METHOD OF AND SERVER FOR GENERATING RETRIEVING ORDER COMMANDS FOR RENDERING A MAP

CROSS-REFERENCE

The present application claims priority to Russian Patent Application No. 2016132427, filed Aug. 5, 2016, entitled "Method of Rendering a Map" the entirety of which is incorporated herein.

FIELD

The present systems and methods described herein are directed towards map rendering, more specifically, to retrieving and rendering map elements in a prescribed order.

BACKGROUND

As the use of maps for displaying information has increased in popularity, so has the volume and complexity of information to be displayed. Thus, it is now more difficult to take in the wide range of data that should be implemented or embedded on the map without the user desirous to view the map becoming confused or overwhelmed by the display of the rendered map.

This problem is particularly acute in the field of map-based or location-based services, where the ever increasingly detailed nature of the information to be displayed, together with the potentially limitless number of resources from which data is gathered, combine to make it extremely challenging to display such information on the map in a logical manner that is accessible and, more particularly, useful to users.

Furthermore, some users may not even require all of the information that is being displayed to them on the map for their specific needs. This may be problematic since transmitting all the information to be displayed may require a considerable amount of time, especially if some information to be displayed ought to be interactive or dynamic. For example, map applications or web browsers typically download map data to a client device through a network in response to an indication that a user is desirous of viewing the map. A conventional method for downloading map data is to have the client device communicate the request for data to a remote server via the network, which, in response, transmits all map data at once to the client device.

Map data may generally be stored in blocks known as "map tiles", where the number of map tiles increases with zoom level. The remote server provides all map tiles for a particular location or region to the client device for storage and/or rendering of the map on the client device. Additional information for embedding interactive maps, such as additional resources and additional application programming interfaces (APIs), may also be requested by the client device. However, the larger the number of map tiles and additional data necessary to display an interactive map, the longer the retrieving and the rendering time, especially if the network is slow or not stable.

SUMMARY

It is an object of the present technology to ameliorate at least some of the inconveniences present in the prior art.

Embodiments of the present technology have been developed based on inventors' appreciation of the need to reduce the amount of time delay required for displaying useful map information to a user. Without wishing to be bound to any specific theory, the present technology, in at least some embodiments thereof, may allow generating and transmitting commands for partially and immediately displaying the map with immediately useful to the user and/or immediately needed to the user and/or immediately required for rendering of the map or interactive elements, while the rest of the map and the rest of interactive elements are retrieved and/or rendered by the client device at a later time.

In some implementations of the present technology, there is provided a method of rendering a map. The map comprises a plurality of map elements and a client device is associated with a user. The method is executable at a server and comprises acquiring, by the server, device data and user data. The device data is indicative of characteristics of the client device and the user data is indicative of user behaviour of the user. The method also comprises determining, by the server, priority map elements and auxiliary map elements within the plurality of map elements based on at least one of the device data and the user data. The priority map elements comprise priority map tiles and at least one of priority API data and priority resource data. The method also comprises generating, by the server, retrieving order commands based on the priority map elements and the auxiliary map elements and transmitting, by the server, the retrieving order commands to the client device. The retrieving order commands are instrumental in causing the client device to retrieve the plurality of map elements in a prescribed order of retrieval and the priority map elements are to be retrieved before the auxiliary map elements.

In some implementations of the method, the method further comprises transmitting, by the server, the plurality of map elements in the prescribed order of retrieval to the client device.

In some implementations of the method, the auxiliary map elements comprise auxiliary map tiles.

In some implementations of the method, the auxiliary map elements further comprise at least one of auxiliary API data and auxiliary resource data.

In some implementations of the method, the determining the priority map elements and the auxiliary map elements further comprises determining, by the server, a specific subset of map elements. The specific subset of map elements comprises the priority map elements, the specific subset of map elements is necessary for rendering the map based on at least one of the characteristics of the client device and the user behaviour of the user.

In some implementations of the method, the determining the priority map elements and the auxiliary map elements further comprises determining, by the server, a specific subset of map tiles, at least one of a specific subset of API data and a specific subset of resource data, the specific subset of map tiles comprises the priority map tiles, the specific subset of API data comprises the priority API data and the specific subset of resource data comprises the priority resource data. The specific subset of map tiles and the at least one of the specific subset of API data and the specific subset of resource data is necessary for rendering the map based on characteristics of the client device and the user behaviour of the user.

In some implementations of the method, the transmitting comprises, in response to a request from the client device for rendering the map, merging, by the server, the retrieving order commands into an html document where the html document comprises computer-executable code for rendering the map, and sending, by the server, the html document to the client device for rendering the map on the client device.

In some implementations of the method, the merging the retrieving order commands further comprises rendering, by the server, the priority map tiles and merging, by the server, the priority map tiles having been rendered into the html document. The retrieving order commands are instrumental in causing the client device to retrieve the at least one of priority API data and priority resource data in the prescribed order of retrieval where the at least one of priority API data and priority resource data are to be retrieved before the auxiliary map elements In some implementations of the method, the method further comprises generating, by the server, rendering order commands based on the priority map elements and the auxiliary map elements and transmitting, by the server, the rendering order commands to the client device. The retrieving order commands are instrumental in causing the client device to render the plurality of map elements in a prescribed rendering order and the priority map elements are to be rendered before the auxiliary map elements.

In some implementations of the present technology, there is provided a server for rendering a map. The map comprises a plurality of map elements, a client device being associated with a user, the server being configured to: acquire device data and user data where the device data is indicative of characteristics of the client device and the user data is indicative of user behaviour of the user. The server is also configured to determine priority map elements and auxiliary map elements within the plurality of map elements based on at least one of the device data and the user data. The priority map elements comprise priority map tiles and at least one of: priority API data and priority resource data. The server is also configured to generate retrieving order commands based on the priority map elements and the auxiliary map elements. The server is also configured to transmit the retrieving order commands to the client device, the retrieving order commands being instrumental in causing the client device to retrieve the plurality of map elements in a prescribed order of retrieval, the priority map elements are to be retrieved before the auxiliary map elements.

In some implementations of the server, the server is further configured to transmit the plurality of map elements in the prescribed order of retrieval to the client device.

In some implementations of the server, the auxiliary map elements comprise auxiliary map tiles.

In some implementations of the server, the auxiliary map elements further comprise at least one of: auxiliary API data and auxiliary resource data.

In some implementations of the server, in order to determine the priority map elements and the auxiliary map elements the server is further configured to determine a specific subset of map elements. The specific subset of map elements comprises the priority map elements. The specific subset of map elements are necessary for rendering the map based on at least one of the characteristics of the client device and the user behaviour of the user.

In some implementations of the server, on order to determine the priority map elements and the auxiliary map elements the server is further configured to determine a specific subset of map tiles, at least one of a specific subset of API data and a specific subset of resource data. The specific subset of map tiles comprising the priority map tiles, the specific subset of API data comprises the priority API data, the specific subset of resource data comprises the priority resource data. The specific subset of map tiles and the at least one of the specific subset of API data and the specific subset of resource data are necessary for rendering the map based on characteristics of the client device and the user behaviour of the user.

In some implementations of the server, In order to transmit the server is configured to, in response to a request from the client device for rendering the map, merge the retrieving order commands into an html document, the html document comprising computer-executable code for rendering the map. The server is also configured, in response to a request from the client device for rendering the map, to send the html document to the client device for rendering the map on the client device.

In some implementations of the server, to merge the retrieving order commands the server being configured to render the priority map tiles and merge the priority map tiles having been rendered into the html document. In this case, the retrieving order commands are instrumental in causing the client device to retrieve the at least one of priority API data and priority resource data in the prescribed order of retrieval. The at least one of priority API data and priority resource data are to be retrieved before the auxiliary map elements.

In some implementations of the server, the server is further configured to generate rendering order commands based on the priority map elements and the auxiliary map elements.

The server is also configured to transmit the rendering order commands to the client device where the retrieving order commands are instrumental in causing the client device to render the plurality of map elements in a prescribed rendering order. The priority map elements are to be rendered before the auxiliary map elements.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication. Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DESCRIPTION

Figure 1:
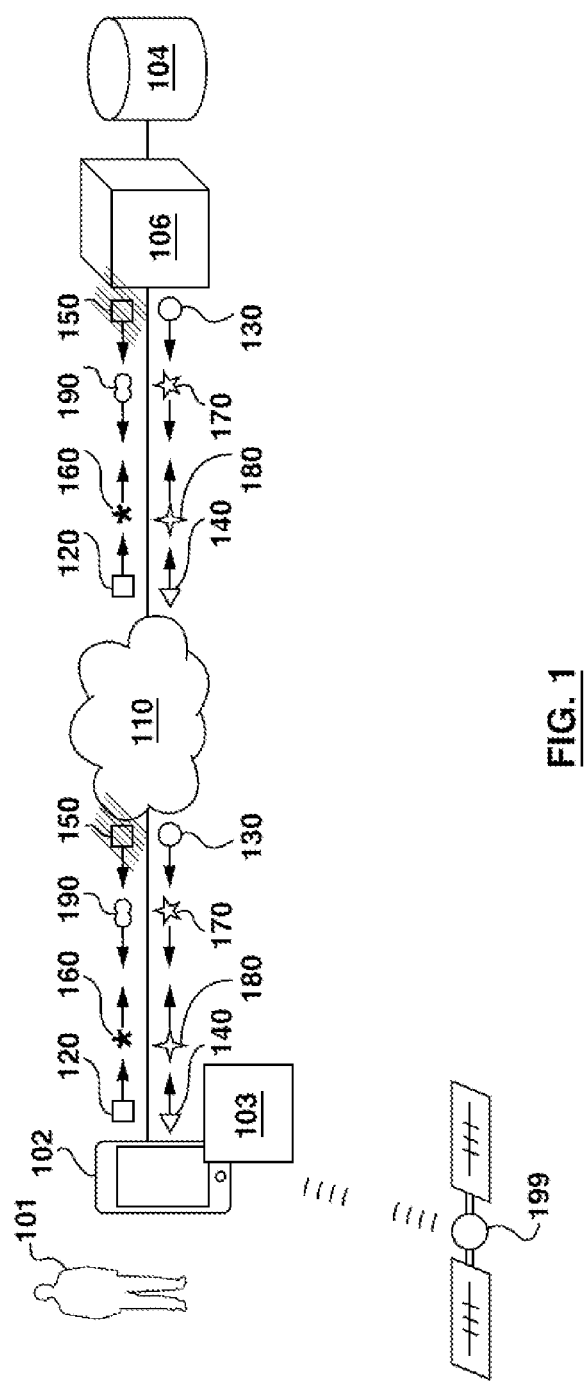
FIG. 1 is a schematic diagram of a system for rendering a map.

In FIG. 1 there is depicted a schematic diagram of a system 100 which is communicatively coupled via a network 110 such as envisioned in some embodiments of the present technology. It is to be expressly understood that the system 100 is depicted as an illustrative implementation of the present technology. Thus, the following description should be considered only as the description of the illustrative implementation of the present technology. This description is not intended to define the scope or set forth the bounds of the present technology. In some cases, what are believed to be helpful examples of modifications to the system 100 may also be described below. This is done merely as an aid to understanding, and, again, not to define the scope or set forth the bounds of the present technology. These modifications are not an exhaustive list, and, as a person skilled in the art would understand, other modification are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

In some embodiments of the present technology, the system 100 may comprise client device 102, a server 106, a storage 104, all of which will be further described below with respect to some examples of implementations of the present technology. As depicted in FIG. 1, the client device 102, the server 106 and are communicatively coupled via the network 110. In another embodiment, the server 106 may also be communicatively coupled to the storage 104 via the network 110.

How a communication coupling via the network 110 is implemented is not particularly limited and will depend on which devices are connected to the network 110. As a non-limiting example, the connection of the server 106 to the network 110 can be implemented via a wired connection (such as an Ethernet based connection). At the same time, other devices could also be connected in other ways. In those examples, where the client device 102 is implemented as a wireless communication device (e.g. a smart-phone), the connection can be implemented as a wireless communication network (such as but not limited to, a 3G communications network link, a 4G communications network link, a Wireless Fidelity, or WiFi® for short, Bluetooth® and the like).

As previously mentioned, the system 100 may comprise the server 106. The server 106 may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 106 is a single server. In alternative non-limiting embodiments of the present technology, the functionality of the server 106 may be distributed and may be implemented via multiple servers. In some embodiments, the server 106 may be configured to store computer-readable instructions that, when executed, may facilitate accomplishing and/or performing some or all functionalities of the present technology.

The server 106 may be configured to host one or more map services that provide map data to various devices, such as the client device 102. For example, the server 106 may be configured to host Yandex.Maps™ map service. In some embodiments, the server 106 may be configured to provide the map data to the client device 102 after receiving an initial request 120 for displaying the map from the client device 102.

The implementations of the server 106 are well known in the art. So, suffice it to state that the server 106 may comprise inter alia a network communication interface (such as a modem, a network card and the like) (not depicted) for a two-way communication over the network 110; and processors (not depicted) coupled to the respective network communication interfaces, the processors being configured to execute various routines, including those described herein below. To that end the processors may store and/or have access to the computer-readable instructions mentioned above.

As previously mentioned, the system 100 may comprise the client device 102 The implementation of the client device 102 is not particularly limited, but as an example, the client device 102 may interact with the server 106 by receiving input from a user 101 and receiving and transmitting data via the network 110. The client device 102 may be, for example and without being limitative, a desktop computer, a laptop computer, a smart phone (e.g. an Apple iPhone™ or a Samsung Galaxy S5™), a personal digital assistant (PDA) or any other device including computing functionality and data communication capabilities.

The client device 102 may comprise internal hardware components including one or more single or multi-core processors collectively referred to herein as processor (not depicted), and a random access memory (not depicted) as well as a network interface (not depicted) for communicating with the server 106. The client device 102 may also comprise a GPS receiver (not depicted) for receiving a GPS signal from one or more GPS satellite, such as a satellite 199 depicted in FIG. 1.

The client device 102 may be configured to execute a map application, such as an application 103, or any application (including any browser) that allows the user 101 to access a map service, such as the map service hosted by the server 106, via the network 110. In some embodiments of the present technology, in order to access the map service hosted by the server 106, the user 101 may be required to log in to his user profile associated with the map service hosted by the server 106. In some embodiments, the client device 102 may be configured to store device data associated therewith and user data associated with the user 101.

Generally speaking, the device data is indicative of characteristics of the client device 102. For example, the device data may comprise information about:
- connectivity speed to the network 110 (e.g., internet connection speed);
- connectivity stability to the network 110 (e.g., internet connectivity stability);
- physical memory of the client device 102;
- screen resolution of the client device 102;
- viewport size of the application 103 executed by the client device 102;
- geolocation of the client device 102 (which may be received by the client device 102 from the satellite 199); and
- others.

It should be appreciated that the device data may comprise information about additional characteristics of the client device 102 to those mentioned above.

Broadly speaking, the user data is indicative of user behaviour of the user 101. For example, the user data may comprise information about various metrics which represent the user interactions of the user 101 with the application 103. For example, the user data may comprise information about:
- previous hyperlink selections by the user 101;
- previous dragging operations executed by the user 101 in the application 103;
- previous selections of given interactive elements by the user 101 in the application 103; and
- others.

It should be appreciated that the user data may comprise information about other metrics which evaluate the user behaviour of the user 101 with the application 103 to the various metrics mentioned above. User data can be tracked, analyzed and stored by the application 103.

As shown in FIG. 1, the storage 104 is communicatively coupled to the server 106 but, in alternative implementations, the storage 104 may be communicatively coupled to the server 106 via the network 110 without departing from the teachings of the present technology. Although the storage 104 is illustrated schematically herein as a single entity, it is contemplated that the storage 104 may be configured in a distributed manner, for example, the storage 104 could have different components, each component being configured for a particular kind of retrieval therefrom or storage therein. The storage 104 may be a structured collection of data, irrespective of its particular structure or the computer hardware on which data is stored, implemented or otherwise rendered available for use. The storage 104 may reside on the same hardware as a process that stores or makes use of the information stored in the storage 104 or it may reside on separate hardware, such as on the server 106. Generally speaking, the storage 104 may receive data from the server 106 for storage thereof and may provide stored data to the server 106 for use thereof.

The storage 104 may be configured to store a plurality of map elements associated with the map to be rendered. In general, the plurality of map elements may comprise all data that is necessary to render the map in the application 103. In one embodiment, the plurality of map elements may comprise map tiles, API data and resource data. In some embodiments, the storage 104 may also be configured to store the device data associated with the device 102 and the user data associated with the user 101.

Generally speaking, the map tiles may be representative of the whole of the map at each zoom level which may form a map image displayed to the user 101 via the client device 102. Each map tile may include a level of detail (e.g., map tile information) showing various features on that map tile, such as landscape features relevant to its scale, including cities, towns, villages, buildings, roads, railways, walkways, lakes, rivers, woodlands, points of interest, relief or terrain, three-dimensional quality of the surface, specific landforms, etc. Each map tile may also include a level of quality (e.g., map tile resolution) related to graphical resolution of the various features.

Broadly speaking, the resource data may comprise information about static elements, dynamic elements and interactive elements to be displayed on the map. For example, the resource data may comprise information about labels, toponyms associated with various features and venues on the map, a tool bar, a search bar, a sidebar, various images, geographical coordinates, addresses, etc. Suffice it to state that the resource data may comprise data about any or all data associated with various resources that are necessary for rendering the map in the application 103.

In general, API data may comprise information for embedding the map in a web browser or another application, such as the application 103, and positioning objects thereon. The API data may comprise a set of Java Script components for implementing the interactive elements on the map in the application 103. The API data may enable the display of the map with various geo-objects, address searching function, routes plotting, assigning personalised directions, etc. In some embodiments, the API data may enable conversion of geographical coordinates on the map to addresses on the map and vice versa. In other embodiments, the API data may enable identification of coordinates of labels and/or toponyms associated with various features and venues on the map. Needless to say, the API data may comprise information about how the resource data should be implemented and may enable the embedding thereof on the map in order to display interactive elements on the map.

The client device 102 may be configured to generate the initial request 120 for displaying the map in response to user 101 opening the application 103 on the client device 102. In other embodiments, the client device 102 may be configured to generate the initial request 120 after the user 102 has logged into his or her profile associated with the map server hosted by the server 106 via the application 103. For example, the initial request 120 may be a data packet comprising necessary information (such as geolocation coordinates, etc.) for requesting the display of the map on the client device 102 and configured for sending the necessary information via the network 110. The client device 102 may be configured to send the initial request 120 to the server 106.

In some embodiments, responsive to the receiving of the initial request 120, the server 106 may be configured to request the device data associated with the client device 102 and the user data associated with the user 101. As a result, the server 106 may be configured to generate a server request 130 for retrieving the device data and the user data. In some embodiments, the server 106 may be configured to generate a first server request and a second server request, instead of the server request 130, for retrieving the device data and the user data, respectively. As an alternative, device data and user data may be embedded in the initial request 120.

In some embodiments, the server request 130 may be sent to the client device 102 for acquiring the device data and the user data. After receiving the server request 130, the client device 102 may be configured to generate a client data packet 140 comprising the device data and the user data. The client device 102 may then send the client data packet 140 via the network 110 to the server 106. Although in FIG. 1 the server request 130 is sent to the client device 102, in other embodiments of the present technology, the server request 130 may be sent to the storage 104 for acquiring the device data and the user data.

In an additional embodiment, the initial request 120 may comprise the device data and the user data. For example, when generating the initial request 120, the client device 102 may be configured to include the device data and the user data in the initial request 120. In this case, the server 106 may acquire the device data and the user data via the initial request 120 without generating the server request 130.

The server 106 may be configured to perform a preliminary analysis of the device data. The preliminary analysis of the device data and the user data by the server 106 may allow the server 106 to determine whether to initiate a standard rendering mode of the map on the client device 102 or a priority rendering mode of the map on the client device 102. This means that in some embodiments, the server 106 may selectively initiate the standard rendering mode of the map or the priority rendering mode of the map based on the preliminary analysis of the device data and the user data. In yet an additional embodiment, it is contemplated within the scope of the present technology that the server 106 may be configured to initiate the priority rendering mode without executing the preliminary analysis.

In other embodiments, during the preliminary analysis, the server 106 may compare the characteristics of the client device 102 with threshold requirement values in order to determine whether the characteristics of the client device 102 meet the suitable requirements. For example, the server 106 may determine that the internet connection speed of the client device 102 is superior to a threshold requirement value associated with the internet connection speed requirement. In another example, the server 106 may determine that the internet connection stability of the client device 102 is superior to a threshold requirement value associated with the internet connection stability requirement. As such, after the preliminary analysis of the device data by the server 106, the server 106 may determine that the characteristics of the client device 102 meet suitable requirements for initiating the standard rendering mode of the map on the client device 102.

After a selective initiation of the standard rendering mode, the server 106 may generate a map data packet 150 comprising an HTML document. The server 106 may be configured to send the map data packet 150 to the client device 102. The HTML document may comprise computer-executable code for rendering the map on the client device 102. For example, the application 103 may parse the HTML document and may identify the plurality of map elements required for rendering the map on the client device 102. In other words, the application 103 may be configured to retrieve the plurality of map elements from the storage 104 based on the computer-executable code and may render the map on the client device 102 after retrieving the plurality of map elements. As previously mentioned, the plurality of map elements may comprise the map tiles, the API data and the resource data.

In other embodiments, the map data packet 150 may comprise other documents than the HTML document written in other markup languages (i.e., not HTML). It should be noted that the other documents may comprise the computer-executable code for rendering the map on the client device 102 and that the HTML document is only one of many possible documents that the map data packet 150 may comprise.

Figure 2:
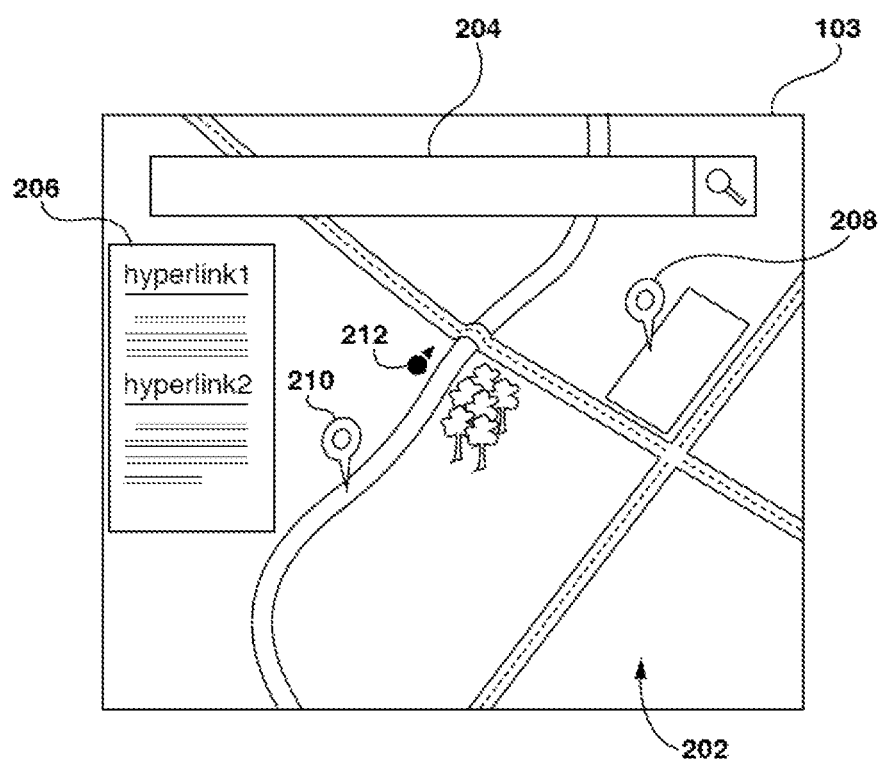
FIG. 2 depicts a display of a first map image in an application after the initiation of a standard rendering mode by a server as contemplated is some embodiments of the present technology.

After the selective initiation of the standard rendering mode by the server 106, the application 103 may receive the map data packet 150 for rendering a first map image 202 depicted in FIG. 2. In this case, since the server 106 initiated the standard rendering mode, the application 103 may parse the HTML document within the map data packet 150 and, based on the computer-executable code included in the HTML document, may be configured to retrieve the map tiles, the API data and the resource data from the storage 104 for rendering the first map image 202.

After retrieving the map tiles, the API data and the resource data, the application 103 may be configured to render and display the first map image 202 with a first interactive element 208, a second interactive element 210, a third interactive element 212, a search bar 204 and a sidebar 206. The application 103 may be configured to render the first map image 202 based on the map tiles retrieved from the storage 104. The application 103 may be configured to implement the first interactive element 208, the second interactive element 210, the third interactive element 212, the search bar 204 and the sidebar 206 based on the API data and the resource data retrieved from the storage 104.

It should be noted that in this case, after the server 106 selectively initiated the standard rendering mode, the HTML document comprises computer-readable code that when parsed, indicates to the application 103 to retrieve all the map tiles, all the API data and all the resource data prior to the rendering of the map tiles and the implementation of the first interactive element 208, the second interactive element 210, the third interactive element 212, the search bar 204 and the sidebar 206. Generally speaking, if the server 106 initiated the standard rendering mode, the application 103 will:

(i) retrieve, based on the computer-executable code of the HTML document, all the map tiles, all the API data and all the resource data necessary for displaying a given map view;

(ii) after retrieving all the map tiles, all the API data and all the resource data, the application 103 will process all the map tiles, all the API data and all the resource data necessary for displaying the given map; and (iii) after processing all the map tiles, all the API data and all the resource data necessary for displaying the given map, the application 103 will display on the client device 102 the given map.

In another embodiment, the server 106 may be configured to selectively initiate the priority rendering mode based on the preliminary analysis of the device data. It should be understood that the selective initiation may be initiated in various ways. For example, after the preliminary analysis of the device data by the server 106, the server 106 may determine that the characteristics of the client device 102 do not meet the suitable requirements. The server 106 may be configured to initiate the priority rendering mode of the map on the client device 102.

In an additional embodiment, the server 106 may selectively initiate the priority rendering mode based on a previous initiation of the priority rendering mode for the client device 102. For example, the server 106 may determine based on the preliminary analysis of the device data that the server 106 previously initiated a priority rendering mode on the client device 102. In this case, the server 106 may selectively initiate the priority rendering mode of the map on the client device 102. In yet another embodiment, the server 106 may be configured to directly initiate the priority rendering mode of the map on the client device without executing the preliminary analysis of the device data.

In some embodiments where the server 106 is configured to execute the preliminary analysis of the device data, the server 106 may determine that the internet connection speed of the client device 102 is inferior to the threshold requirement value associated with the internet connection speed requirement and/or that the internet connection stability of the client device 102 is inferior to the threshold requirement value associated with the internet connection stability requirement. The server 106 may be configured to initiate the priority rendering mode of the map based on such determination.

For ease of understanding, if the characteristics of the client device 102 do not meet the suitable requirements, retrieving and rendering the map with all the interactive elements before displaying all of them on the client device 102 may require excessive waiting time. Therefore, the server 106 may be configured to initiate the priority rendering mode if the characteristics of the client device 102 do not meet the suitable requirements. The server 106 may be configured to initiate the priority rendering mode in order to allow the user 101 to view the map with prioritized interactive elements while the client device 102 is waiting for auxiliary interactive elements to be retrieved for the rendering and the displaying thereof. Indeed, while the auxiliary interactive elements are being retrieved, rendered and displayed by the client device 102, the user 101 may be desirous of viewing immediately a prioritized map section with prioritized interactive elements which are useful and/or relevant thereto and/or needed thereby. How the server 106 determines the prioritized map section with the prioritized interactive elements and the auxiliary interactive elements will be further described below with respect to some embodiments of the present technology.

Following the initiation of the priority rendering mode of the map, the server 106 may be configured to determine priority map elements and auxiliary map elements amongst the plurality of map elements. The server 106 may determine the priority map elements and the auxiliary map elements based on at least one of the device data associated with the client device 102 and the user data associated with the user 101.

The priority map elements comprise priority map tiles. In some embodiments however, the priority elements may comprise the priority map tiles and priority API data. In other embodiments, the priority elements may comprise the priority map tiles, the priority API data and priority resource data. The priority map tiles may be a specific subset of map tiles of all the map tiles. The priority API data may be a specific subset of API data of all the API data. The priority resource data may be a specific subset of resource data of all the resource data.

Similarly, the auxiliary map elements comprise auxiliary map tiles. In additional embodiments however, the auxiliary map elements may comprise the auxiliary map tiles and at least one of auxiliary API data and auxiliary resource data.

Generally speaking, the server 106 may determine which map elements in the plurality of map elements are the priority map elements and which map elements in the plurality of map elements are the auxiliary map elements in order to instruct the client device 102 to retrieve the priority map elements before the auxiliary map elements. How the priority map elements (i.e., the specific subset of map tiles, the specific subset of API data and the specific subset of resource data) are determined by the server 106 and the way that the server 106 instructs the client device 102 to retrieve the priority map elements before the auxiliary map elements will now be described.

The server 106 may determine the priority map tiles based on device data. For example, the server 106 may determine that the specific subset of map tiles should map tiles that correspond to a section of the map that is near the current geolocation of the client device 102 (i.e., the current geolocation of the client device 102 is included in the device data). In other words, the server 106 may determine the priority map tiles based on the current geolocation of the client device 102.

In other embodiments, the server 106 may also determine the priority map tiles based on user data. For example, the server 106 may identify a frequently used zoom level by the user 101 based on the user data. In this case, the server 106 may be configured to determine that the specific subset of map tiles should comprise map tiles that are associated with the frequently used zoom level. In other words, the server 106 may be configured to determine the priority map tiles based on the user data.

It is contemplated that in additional embodiments, the server 106 may determine the map tiles based on the device data and the user data. For example, the server 106 may determine that the specific subset of map tiles should comprise map tiles that correspond to the section of the map that is near the current geolocation of the client device 102 and that are associated with the frequently used zoom level.

The server 106 may be configured to determine the priority resource data based on the user data. For example, the server 106 may determine that the user 101 frequently interacts with labels of points of interests on maps and rarely interacts with sidebars displayed with maps in the application 103 based on the user data. As a result, the server 106 may determine that the specific subset of resource data should include resource data associated with the labels of the points of interests. Also as a result, the server 106 may determine that resource data associated with sidebars is part of the auxiliary resource data.

The server 106 may be configured to determine the priority API data based on the user data. Continuing with the previous example, the server 106 may determine that the user 101 frequently interacts with the labels of points of interests on maps and rarely interacts with the sidebars displayed with maps in the application 103 based on the user data. As a result, the server 106 may determine that the specific subset of API data should include API data for implementing the labels of the points of interests with the map. Also as a result, the server 106 may determine that API data for implementing the sidebars is part of the auxiliary API data.

After determining the priority map elements of the plurality of map elements and the auxiliary map elements of the plurality of map elements, the server 106 may be configured to generate retrieving order commands based on the priority map elements and the auxiliary map elements. Broadly speaking, the retrieving order commands may provide indications to applications, such as the application 103, for retrieving the plurality of map elements in a prescribed order of retrieval.

The server 106 may be configured to transmit the retrieving order commands to the client device 102 which are instrumental in causing the client device 102 to retrieve the plurality of map elements in the prescribed order of retrieval. For example, the prescribed order of retrieval may indicate to the client device 102 to retrieve the priority map elements before the auxiliary map elements.

Additionally, since the retrieving order commands are generated based on the priority map elements and the auxiliary map elements, the retrieving order commands are representative of the prescribed order of retrieval of the plurality of elements for suiting at least one of the characteristics of the client device 102 and the user behaviour of the user 101. In other words, the retrieving order commands are personalised for the at least one of the client device 102 and the user 101 in order to retrieve the priority map elements and the auxiliary map elements in a prescribed order of retrieval. This means that the retrieving order commands may define a a retrieval prioritisation of map elements during the retrieving operations executed by the application 103 of the client device 102 based on whether given map elements are priority map elements or auxiliary map elements.

In some embodiments, in order to transmit the retrieving order commands to the client device 102, the server 106 may be configured to merge the retrieving order commands into the HTML document. As such, the server 106 may create a modified HTML document that comprises the computer-executable code for rendering the map and the retrieving order commands for retrieving the plurality of map elements in the prescribed order of retrieval. Then, the server 106 may be configured to send the map data packet 150 comprising the modified HTML document to the client device 102 via the network 110.

The client device 102 may receive the map data packet 150 comprising the modified HTML document. The application 103 may parse the modified HTML document and may identify the priority map elements based on the retrieving order commands in the modified HTML document. As a result, the client device 102 may be configured to generate a priority request 160 comprising the information for retrieving the priority map elements. The priority request 160 may be sent via the network 110 to the server 106. After the receipt of the priority request 160 by the server 106, the server 106 may be configured to retrieve the priority map elements from the storage 104. The server 106 may generate a priority data packet 170 comprising the priority map elements and may send priority data packet 170 over the network 110 to the client device 102.

Figure 3:
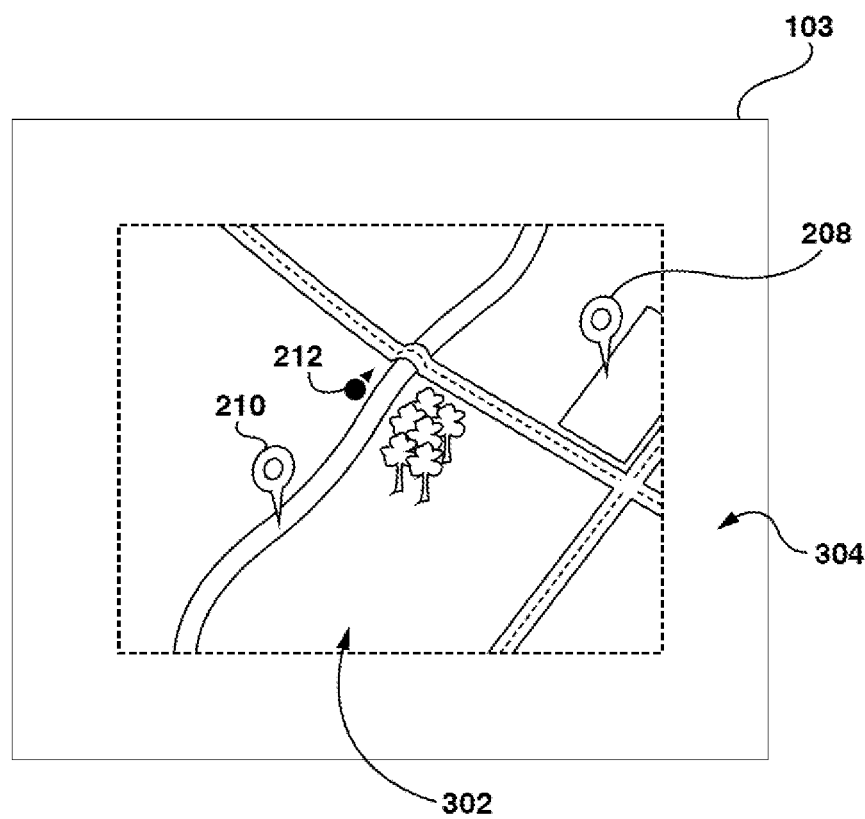
FIG. 3 depicts a display of a prioritized map and prioritized interactive map elements in an application after the initiation of a priority rendering mode by a server as contemplated is some embodiments of the present technology.

Responsive to the receipt of the priority data packet 170 by the client device 102, the application 103 may render the priority map elements and may display to the user 101 via the client device 102 a priority map image 302 depicted in FIG. 3. In other words, after retrieving the priority map tiles, the priority API data and the priority resource data, the application 103 may be configured to render and display priority map image 302 with the first interactive element 208, the second interactive element 210 and the third interactive element 212.

The priority map image 302 may be rendered and displayed based on the specific subset of map tiles in all the map tiles such as, for example, all the map tiles that were necessary to render and display the first map image 202 in FIG. 2. Indeed, an unrendered zone 304 depicted in FIG. 3 may correspond to a region of the first map image 202 that requires the auxiliary map tiles for rendering, which are not yet retrieved from the server 106 in accordance with the prescribed order of retrieval.

The first interactive element 208, the second interactive element 210 and the third interactive element 212 may be rendered and displayed based on the specific subset of API data in all the API data and based on the specific subset of resource data in all the resource data. In this case, the auxiliary API data and the auxiliary resource data may be associated with the search bar 204 and the sidebar 206 depicted in FIG. 2. Indeed, the search bar 204 and the sidebar 206 are not yet rendered or displayed in the application 103 since the auxiliary API data and the auxiliary resource data are not yet retrieved from the server 106 in accordance with the prescribed order of retrieval.

While waiting for the auxiliary interactive elements such as the search bar 204 and the sidebar 206 to be displayed in the application 103, the user 101 may view immediately a prioritized map section, such as the priority map image 302 depicted in FIG. 3, with prioritized interactive elements, such as the first interactive element 208, the second interactive element 210 and the third interactive element 212, which are useful and/or relevant to the user 101 and/or needed by the user 101.

After retrieving the priority map elements from the server 106, the client device 102 may be configured to generate an auxiliary data request 180 comprising the information for retrieving the auxiliary map elements. In some embodiments, the client device 102 may be configured to generate the auxiliary data request 180 after the priority map image 302, the first interactive element 208, the second interactive element 210 and the third interactive element 212 are rendered in the application 103. In other embodiments, the client device 102 may be configured to generate the auxiliary data request 180 after the priority map image 302, the first interactive element 208, the second interactive element 210 and the third interactive element 212 are displayed in the application 103. The auxiliary request 180 may be sent via the network 110 to the server 106. Responsive to the receipt of the auxiliary request 180 by the server 106, the server 106 may be configured to retrieve the auxiliary map elements from the storage 104. The server 106 may generate an auxiliary data packet 190 comprising the auxiliary map elements and may send auxiliary data packet 190 over the network 110 to the client device 102.

Responsive to the receipt of the auxiliary data packet 190 by the client device 102, the application 103 may render the auxiliary map elements and may display to the user 101 via the client device 102 an auxiliary map section corresponding to the auxiliary map tiles associated with the unrendered zone 304 and the auxiliary interactive elements, such as the search bar 204 and the sidebar 206, alike to what is depicted in FIG. 3.

In another embodiment of the present technology, responsive to determining the priority map elements of the plurality of map elements and the auxiliary map elements of the plurality of map elements, the server 106 may be configured to generate the retrieving order commands and rendering order commands based on the priority map elements and the auxiliary map elements. In general, the rendering order commands may provide indications to applications, such as the application 103, for rendering the plurality of map elements in a prescribed rendering order.

The server 106 may be configured to transmit the rendering order commands to the client device 102 which are instrumental in causing the client device 102 to render the plurality of map elements in a prescribed rendering order. For example, the prescribed rendering order may indicate to the client device 102 to render the priority map elements right after the priority map elements have been retrieved. In another example, the prescribed rendering order may indicate to the client device 102 to render the priority map elements before the auxiliary map elements.

In some embodiments, in order to transmit the rendering order commands to the client device 102, the server 106 may be configured to merge the rendering order commands into the modified HTML document. As such, the server 106 may create the modified HTML document that comprises the computer-executable code for rendering the map, the retrieving order commands for retrieving the plurality of map elements in the prescribed order of retrieval and the rendering order commands for rendering the plurality of map elements in the prescribed rendering order. Then, the server 106 may be configured to send the map data packet 150 comprising the modified HTML document to the client device 102 via the network 110.

For example, responsive to the receipt of the priority data packet 170 by the client device 102, the rendering order commands may indicate to the application 103 to render the priority map elements. In another example, responsive to the receipt of the auxiliary data packet 190 by the client device 102, the rendering order commands may indicate to the application 103 to render the auxiliary map elements. This means that a given rendering command may be triggered by a receipt of a given data packet by the client device 102 from the server 106.

In some embodiments, the rendering order commands may indicate to the application 103 to render the priority map elements in response to the retrieving order commands indicating to the application 102 to retrieve the auxiliary map elements. This means that a given rendering order command may be triggered by a given retrieving order command and/or by transmitting a given request, such as the auxiliary request 180, by the client device 102 to the server 106.

In additional embodiments, responsive to determining the specific subset of map tiles of the map tiles, the server 106 may be configured to retrieve the priority map tiles from the storage 104 for rendering thereof. The server 106 may render the priority map tiles and merge them into the HTML document. In other words, the server 106 may create the modified HTML document that comprises the computer-executable code for rendering the map, rendered priority map tiles, the retrieving order commands for retrieving the plurality of map elements excluding the priority map tiles in the prescribed order of retrieval and the rendering order commands for rendering the plurality of map elements excluding the rendered priority map tiles in the prescribed rendering order.

In this case, the retrieving order commands may be instrumental in causing the client device 102 to retrieve the at least one of priority API data and priority resource data in the prescribed order of retrieval since the priority map tiles have been already rendered and are comprised in the modified HTML document.

Figure 4:
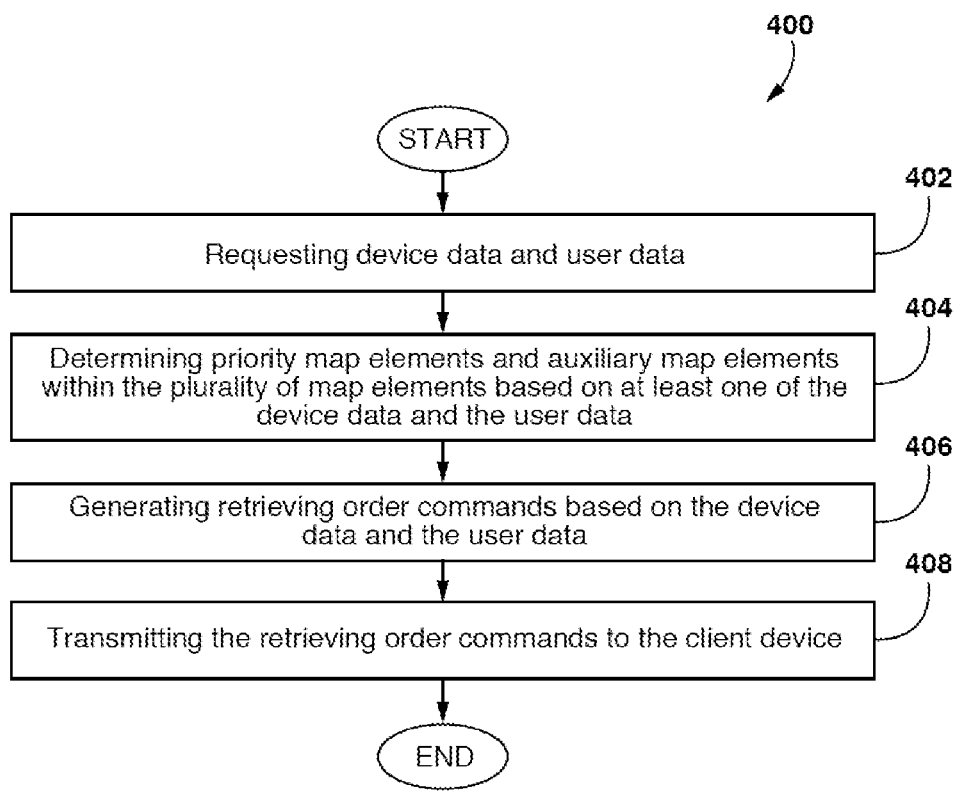
FIG. 4 is a block scheme illustrating a method of rendering a map on a client device as envisioned in some embodiments of the present technology.

In some embodiments of the present technology, the server 106 may be configured to execute a method 400 of rendering the map, which is depicted in FIG. 4.

Step 402: Acquiring Device Data and User Data

The method 400 starts at step 402, with the server 106 acquiring the device data and the user data. The device data is indicative of characteristics of the client device 102 and the user data is indicative of the user behaviour of the user 101. In some embodiments, following the receiving of the initial request 120, the server 106 may be configured to request the device data associated with the client device 102 and the user data associated with the user 101. As a result, the server 106 may be configured to generate a server request 130 for retrieving the device data and the user data. In some embodiments, the server 106 may be configured to generate a first server request and a second server request, instead of the server request 130, for retrieving the device data and the user data, respectively.

The server request 130 may be sent to the storage 104 for retrieving the device data and the user data. In other embodiments, the server request 130 may be sent to the client device 102 for retrieving the device data and the user data. After receiving the server request 130, the client device 102 may be configured to generate a client data packet 140 comprising the device data and the user data. The client device 102 may then send the client data packet 140 via the network 110 to the server 106.

In an additional embodiment, the initial request 120 may comprise the device data and the user data. For example, when generating the initial request 120, the client device 102 may be configured to include the device data and the user data in the initial request 120. In this case, the server 106 may retrieve the device data and the user data via the initial request 120 without generating the server request 130.

Step 404: Determining Priority Map Elements and Auxiliary Map Elements

The method 400 continues to step 404 with the server 106 determines the priority map elements and the auxiliary map elements within the plurality of map elements based on at least one of the device data and the user data. The priority map elements comprise priority map tiles and at least one of the priority API data and the priority resource data.

In some embodiments, prior to determining the priority map elements and the auxiliary map elements, the server 106 may be configured to perform the preliminary analysis of the device data. The preliminary analysis of the device data and the user data by the server 106 may allow the server 106 to determine whether to initiate the standard rendering mode of the map on the client device 102 or the priority rendering mode of the map on the client device 102. Therefore in some embodiments, the server 106 may selectively initiate the standard rendering mode or the priority rendering mode. However, in other embodiments, the server 106 may directly initiate the priority rendering mode.

In the case where the priority rendering mode of the map has been initiated by the server 106, the server 106 may be configured to determine priority map elements and auxiliary map elements amongst the plurality of map elements. The server 106 may determine the priority map elements and the auxiliary map elements based on at least one of the device data associated with the client device 102 and the user data associated with the user 101.

Generally speaking, the server 106 may determine which map elements in the plurality of map elements are the priority map elements and which map elements in the plurality of map elements are the auxiliary map elements in order to instruct the client device 102 to retrieve the priority map elements before the auxiliary map elements.

Step 406: Generating Retrieving Order Commands

The method 400 continues with the server 106 generating the retrieving order commands based on the priority map elements and the auxiliary map elements. Broadly speaking, the retrieving order commands may provide indications to applications, such as the application 103, for retrieving the plurality of map elements in the prescribed order of retrieval. For example, the prescribed order of retrieval may indicate to the client device 102 to retrieve the priority map elements before the auxiliary map elements.

In some embodiments, the retrieving order commands may be personalised for the client device 102. In other embodiments, the retrieving order commands may be personalised for the user 101. However, in additional embodiments, the retrieving order commands may be personalised for the client device 102 and the user 101.

In another embodiment, the server 106 may be configured to generate the rendering order commands based on the priority map elements and the auxiliary map elements. In general, the rendering order commands may provide indications to applications, such as the application 103, for rendering the plurality of map elements in the prescribed rendering order. For example, the prescribed rendering order may indicate to the client device 102 to render the priority map elements right after the priority map elements have been retrieved. In another example, the prescribed rendering order may indicate to the client device 102 to render the priority map elements before the auxiliary map elements.

In some embodiments, the rendering order commands may be personalised for the client device 102. In other embodiments, the rendering order commands may be personalised for the user 101. However, in additional embodiments, the rendering order commands may be personalised for the client device 102 and the user 101.

Step 408: Transmitting the Retrieving Order Commands to the Client Device

The method 400 ends at step 408 with the server 106 transmitting the retrieving order commands to the client device 102. The retrieving order commands are instrumental in causing the client device 102 to retrieve the plurality of map elements in a prescribed order of retrieval. For example, the prescribed order of retrieval may indicate to the client device 102 to retrieve the priority map elements before the auxiliary map elements.

In some embodiments, in order to transmit the retrieving order commands to the client device 102, the server 106 may be configured to merge the retrieving order commands into the HTML document. As such, the server 106 may create the modified HTML document that comprises the computer-executable code for rendering the map and the retrieving order commands for retrieving the plurality of map elements in the prescribed order of retrieval. Then, the server 106 may be configured to send the map data packet 150 comprising the modified HTML document to the client device 102 via the network 110.

The client device 102 may receive the map data packet 150 comprising the modified HTML document. The application 103 may parse the modified HTML document and the client device 102 may be configured to generate the priority request 160 comprising the information for retrieving the priority map elements. The priority request 160 may be sent via the network 110 to the server 106. After the receipt of the priority request 160 by the server 106, the server 106 may be configured to retrieve the priority map elements from the storage 104. The server 106 may generate the priority data packet 170 comprising the priority map elements and may send priority data packet 170 over the network 110 to the client device 102.

Following the receipt of the priority data packet 170 by the client device 102, the application 103 may parse the rendering order commands in the modified HTML document. As a result, the rendering order commands may indicate whether the application 103 should render and display the priority map elements.

After retrieving the priority map elements from the server 106, the client device 102 may be configured to generate the auxiliary data request 180 comprising the information for retrieving the auxiliary map elements. The priority request 160 may be sent via the network 110 to the server 106. After the receipt of the auxiliary request 180 by the server 106, the server 106 may be configured to retrieve the auxiliary map elements from the storage 104. The server 106 may generate the auxiliary data packet 190 comprising the auxiliary map elements and may send auxiliary data packet 190 over the network 110 to the client device 102.

Following the receipt of the auxiliary data packet 190 by the client device 102, the application 103 may parse the rendering order commands in the modified HTML document. As a result, the rendering order commands may indicate whether the application 103 should render and display the auxiliary map elements.

In some implementations of the present technology, the server 106 executing the method 400 may allow reducing the amount of processing by the client device 102 for displaying the prioritized map section with the prioritized interactive elements. Indeed, the method 400 allows the client device 102 to selectively display the prioritized map section with the prioritized interactive elements without the need of processing data associated with the entire map and all of the interactive elements thereon.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating retrieving order commands for rendering a map on an application executed by a client device, the map comprising a plurality of map elements, the client device being associated with a user, the client device being connected to the server via a communication network, the method executable at a server, the method comprising:
   receiving, by the server from the client device, an initial request to display the map on the client device;
   in response to receiving the initial request, acquiring, by the server, device data and user data, the device data being indicative of characteristics of the client device and the user data being indicative of past user interactions of the user of the client device with previously displayed map elements:
   performing, by the server, a preliminary analysis of the device data, the preliminary analysis including comparing the characteristics of the client device with threshold requirements values:
   determining, by the server, based on the characteristics of the client device being below the threshold requirement values, to initiate a priority rendering mode of the map by determining, priority map elements and auxiliary map elements within the plurality of map elements based on the device data and the user data, the priority map elements comprising priority map tiles and at least one of priority API data and priority resource data;
   generating, by the server, retrieving order commands based on the priority map elements and the auxiliary map elements; and
   transmitting, by the server, the retrieving order commands to the client device, the retrieving order commands being instrumental in causing the client device to retrieve the plurality of map elements in a prescribed order of retrieval, wherein the priority map elements are to be retrieved before the auxiliary map elements.

2. The method of claim 1, the method further comprises transmitting, by the server, the plurality of map elements in the prescribed order of retrieval to the client device.

3. The method of claim 1, wherein the auxiliary map elements comprise auxiliary map tiles.

4. The method of claim 3, wherein the auxiliary map elements further comprise at least one of auxiliary API data and auxiliary resource data.

5. The method of claim 4, wherein the determining the priority map elements and the auxiliary map elements further comprises determining, by the server, a specific subset of map elements, the specific; subset of map elements comprising the priority map elements, the specific subset of map elements being necessary for rendering the map based on at least one of the characteristics of the client device and the past user interactions of the user.

6. The method of claim 4, wherein the determining the priority map elements and the auxiliary map elements further comprises determining, by the server, a specific subset of map tiles, at least one of a specific subset of API data and a specific subset of resource data, the specific subset of map tiles comprising the priority map tiles, the specific subset of API data comprising the priority API data, the specific subset of resource data comprising the priority resource data, the specific subset of map tiles and the at least one of the specific subset of API data and the specific subset of resource data being necessary for rendering the map based on characteristics of the client device and the past user interactions of the user.

7. The method of claim 1, wherein the transmitting comprises, in response to a request from the client device for rendering the map:
   merging, by the server, the retrieving order commands into an html document, the html document comprising computer-executable code for rendering the map; and
   sending, by the server, the html document to the client device for rendering the map on the client device.

8. The method of claim 7, wherein the merging the retrieving order commands further comprises:
   rendering, by the server, the priority map tiles; and
   merging, by the server, the priority map tiles having been rendered into the html document,
   the retrieving order commands being instrumental in causing the client device to retrieve the at least one of priority API data and priority resource data in the prescribed order of retrieval, the at least one of priority API data and priority resource data are to be retrieved before the auxiliary map elements.

9. The method of claim 1, wherein the method further comprises:
   generating, by the server, rendering order commands based on the priority map elements and the auxiliary map elements; and transmitting, by the server, the rendering order commands to the client device, the retrieving order commands being instrumental in causing the client device to render the plurality of map elements in a prescribed rendering order, the priority map elements are to be rendered before the auxiliary map elements.

10. A server for generating retrieving order commands for rendering a map on an application executed by a client device, the map comprising a plurality of map elements, the client device being associated with a user, the client device being connected to the server via a communication network, the server being configured to:
receive, from the client device, an initial request to display the map on the client device
in response to receiving the initial request, acquire device data and user data, the device data being indicative of characteristics of the client device and the user data being indicative of past user interactions of the user of the client device with previously displayed map elements:
perform a preliminary analysis of the device data, the preliminary analysis including comparing the characteristics of the client device with threshold requirements values:
determine, based on the characteristics of the client device being below the threshold requirement values, to initiate a priority rendering mode of the map by determining priority map elements and auxiliary map elements within the plurality of map elements based on the device data and the user data, the priority map elements comprising priority map tiles and at least one of: priority API data and priority resource data;
generate retrieving order commands based on the priority map elements and the auxiliary map elements; and
transmit the retrieving order commands to the client device, the retrieving order commands being instrumental in causing the client device to retrieve the plurality of map elements in a prescribed order of retrieval, wherein the priority map elements are to be retrieved before the auxiliary map elements.

11. The server of claim 10, wherein the server is further configured to transmit the plurality of map elements in the prescribed order of retrieval to the client device.

12. The server of claim 10, wherein the auxiliary map elements comprise auxiliary map tiles.

13. The server of claim 12, wherein the auxiliary map elements further comprise at least one of: auxiliary API data and auxiliary resource data.

14. The server of claim 13, to determine the priority map elements and the auxiliary map elements the server is further configured to determine a specific subset of map elements, the specific subset of map elements comprising the priority map elements, the specific subset of map elements being necessary for rendering the map based on at least one of the characteristics of the client device and the past user interactions of the user.

15. The server of claim 13, to determine the priority map dements and the auxiliary map elements the server is further configured to determine a specific subset of map tiles, at least one of a specific subset of All data and a specific subset of resource data, the specific subset of map tiles comprising the priority map tiles, the specific subset of API data comprising the priority API data, the specific subset of resource data comprising the priority resource data, the specific subset of map tiles and the at least one of the specific subset of API data and the specific subset of resource data being necessary for rendering the map based on characteristics of the client device and the past user interactions of the user.

16. The server of claim 10, wherein to transmit comprises the server being configured to, in response to a request from the client device for rendering the map:
merge the retrieving order commands into an html document, the html document comprising computer-executable code for rendering the map; and
send the html document to the client device for rendering the map on the client device.

17. The server of claim 16, wherein to merge the retrieving order commands further comprises the server being configured to:
render the priority map tiles; and
merge the priority map tiles having been rendered into the html document,
the retrieving order commands being instrumental in causing the client device to retrieve the at least one of priority API data and priority resource data in the prescribed order of retrieval, the at least one of priority API data and priority resource data are to be retrieved before the auxiliary map elements.

18. The server of claim 10, wherein the server is further configured to:
generate rendering order commands based on the priority map elements and the auxiliary map elements; and
transmit the rendering order commands to the client device, the retrieving order commands being instrumental in causing the client device to render the plurality of map elements in a prescribed rendering order, the priority map elements are to be rendered before the auxiliary map elements.

* * * * *